United States Patent

[11] 3,566,221

| [72] | Inventors | Raymond W. Sargent<br>Bristol;<br>Siderius Van Manen, Mile Point, Vt. |
|---|---|---|
| [21] | Appl. No. | 770,277 |
| [22] | Filed | Oct. 24, 1968 |
| [45] | Patented | Feb. 23, 1971 |
| [73] | Assignee | Simmonds Precision Products, Inc.<br>Tarrytown, N.Y. |

[54] LINEAR VARIABLE CAPACITANCE TRANSDUCER
7 Claims, 5 Drawing Figs.

[52] U.S. Cl. .................................................. 317/246,
323/93, 317/249
[51] Int. Cl. .................................................. H01g 5/14
[50] Field of Search ....................................... 317/245,
249, 246, 249 (T); 324/61 (S); 323/93

[56] References Cited
UNITED STATES PATENTS

| 2,014,422 | 9/1935 | Carter | 323/93 |
| 3,002,104 | 8/1961 | Mynall | 323/93X |
| 3,312,892 | 4/1967 | Barnes | 323/93 |
| 1,297,313 | 3/1919 | Bellini | 317/249X |
| 2,601,445 | 6/1952 | Murakami | 317/249X(T) |
| 2,688,177 | 9/1954 | Wagner | 317/249X(T) |
| 2,892,152 | 6/1959 | Buisson | 317/246X |
| 3,098,183 | 7/1963 | Mitchell | 317/246 |
| 3,181,045 | 4/1965 | Bruntil | 317/249(T) |

FOREIGN PATENTS

| 803,022 | 8/1956 | Great Britain | 317/251 |

*Primary Examiner*—E. A. Goldberg
*Attorney*—Edwin E. Greigg

ABSTRACT: A linear variable capacitance transducer to monitor the axial position of an object by varying the capacitance of the transducer corresponding to the position of the object. When fed an AC signal, the position of the object being monitored corresponds to the proportional AC signal emitted therefrom.

PATENTED FEB 23 1971
3,566,221
SHEET 1 OF 2
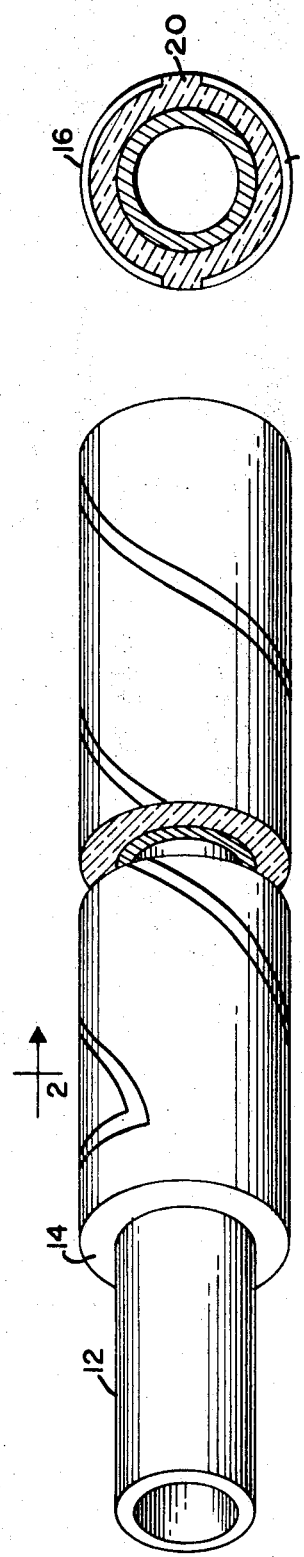
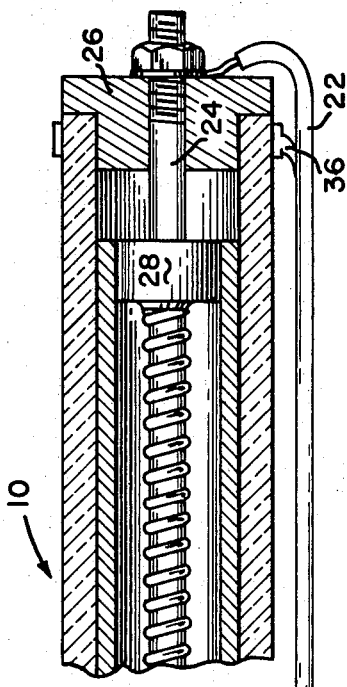
FIG. 2
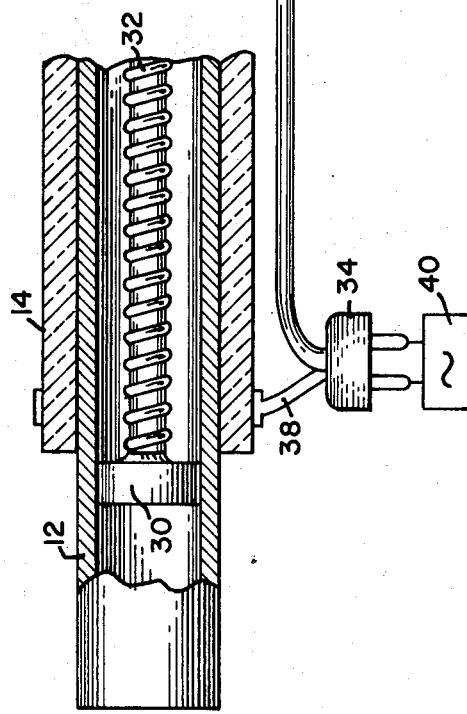
FIG. 3
FIG. 1
INVENTORS
RAYMOND W. SARGENT
SIDERIUS VAN MANEN
BY
ATTORNEY

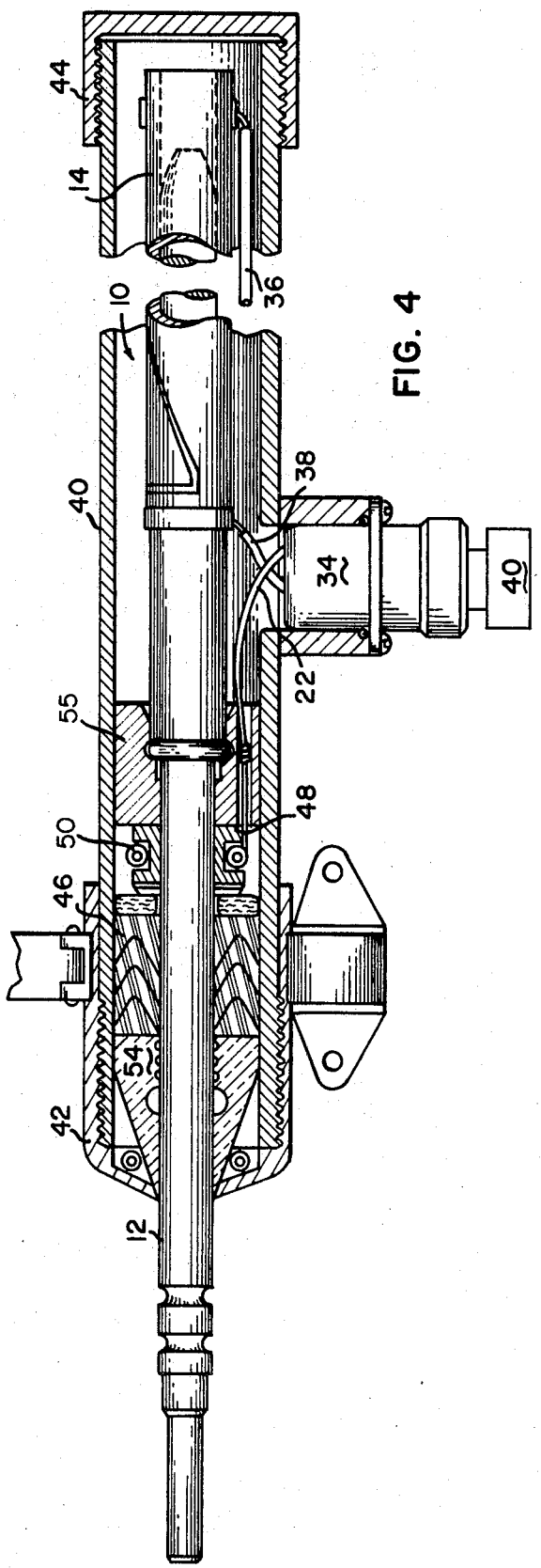
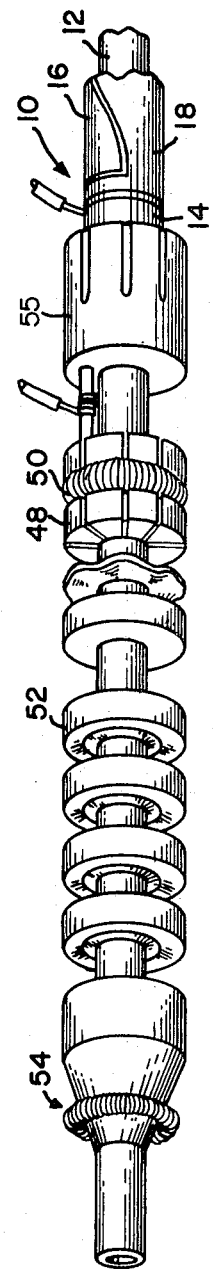
FIG. 4
FIG. 5
INVENTORS
RAYMOND W. SARGENT
SIDERIUS VAN MANEN
BY
ATTORNEY

LINEAR VARIABLE CAPACITANCE TRANSDUCER

CROSS-REFERENCE TO A RELATED APPLICATION

In my prior application there is disclosed a transducer for producing electrical signals in response to displacement of an object being monitored which comprises a pair of capacitor plates between which a tape is arranged to be drawn in dependence upon displacement, a tape having a dimension which varies along its length whereby to alter the effective capacitance between the plates as it is drawn therebetween so that the capacitance varies in dependence upon the displacement.

BRIEF SUMMARY AND OBJECTS OF THE INVENTION

This invention comprises a piston rod slidable within the bore of a quartz tube which has two diametrically opposed metallized areas on its outer surface forming two plates of a capacitor having quartz and air as the dielectric. The two spiraling metallized areas being diametrically opposed and of equal area form the high and low impedance electrodes of a capacitor and the piston rod which is slidably within the bore is at electrical ground potential thereby displacing the air dielectric as it is moved inward plus linearly varying the capacitance as a function of displacement.

In this invention, means are also provided for moisture protection, thermal expansion and other environmental type devices which act as dust removing barriers and the like to prevent the entry of foreign contaminants, etc., to eliminate the possibility of the entry of dust, dirt, or other moisture within the transducer.

In view of the foregoing, it can be seen that it is an object of this invention to provide an improved transducer operative to produce an electrical signal output dependent upon the capacitance of the transducer so as to locate the position of an object being monitored.

Another object of this invention is to provide a linear variable capacitance position transducer for producing a signal in response to displacement of an object and which will be operable under adverse environmental conditions.

BRIEF DESCRIPTION OF THE SEVERAL VIEWS OF THE DRAWINGS

FIG. 1 is an elevational view showing the quartz tube with the capacitor plates disposed thereon, together with the piston rod slidable within the bore of the quartz tube;

FIG. 2 is a cross-sectional view taken along line 2-2 of FIG. 1 and looking in the direction of the arrows;

FIG. 3 is a cross-sectional view partially broken away to illustrate the electrical connections ensuring ground potential for the piston rod and the connection to the capacitor plates;

FIG. 4 is a cross-sectional view of the transducer within its housing and showing the typical connections and sealing devices; and FIG. 5 discloses the transducer assembly with its sealing devices exposed without the housing.

DESCRIPTION OF THE PREFERRED EMBODIMENT

Turning now to FIGS. 1, 2 and 3, it can be seen that the transducer assembly 10 comprises a hollow piston rod 12 slidable within a quartz (glass) tube 14. The quartz tube 14 is provided with a pair of diametrically opposed electrode plate areas 16 and 18, in the embodiment shown, applied as thin conductive metallized coatings to the outside surface and in a helical manner with a narrow gap 20 separating the two plate areas throughout the length of the tube 14.

As clearly shown in FIG. 3, the piston rod 12 is a metal tube in sliding contact with the inside bore of the quartz tube 14. To maintain the piston rod 12 at ground potential, and to a positive electrical connection, a conductor wire 22 is connected to a center conducting rod 24 which extends through the end of closure plug 26 and substantially the length of the quartz tube 14. The piston rod 12 is provided with an end button 28 which is fixed to the rod 12 so as to move with the piston rod 12 in sliding contact with the central connector 24 and with a second end button 30 which is slidable within the tube 12 but fixedly connected so as to be stationary with the center conductor 24. To further ensure positive electrical connection between ground via the conductor 22 and the slidable metal tube, an extension spring 32 is connected to the button 28, coiled around the center conductor 24, and connected thereto near the button 30. This spring serves as an extendable conductor within the piston rod 12.

Capacitive plates 16 and 18 are connected to the main connector 34 by conductor line 36 adjacent the connection to the center conductor 24 and by connector line 38 at the opposite end of the quartz tube. In the actual embodiment, one conductor comprising the two conductors 22 and 36, is a shielded cable with a conductor 22 to ground the shielding connection, and the capacitive plate connected to conductor 38 is a high impedance plate and the connector 36 connects the low impedance plate to the connector plug 34.

From the foregoing, it can be seen that the axial displacement of the piston rod 12 results in a proportional variation of an AC signal by reason of the variation in the capacitance of the transducer having quartz and air as a dielectric. Thus the signal emitted from the signal generator, indicated in its entirely as 36 (FIG. 3) to which the connector 34 is connected, is dependent upon the capacitance of the transducer which, in turn, depends upon the position of the rod 12.

Turning now to FIGS. 4 and 5, which disclose the transducer 10 in an actual operating arrangement, it can be seen that the entire transducer 10 is housed in an outer tubular element 40 having end closures 42 and 44. These serve as structural and electrically shielding members and also contain the sealing devices indicated in their entirety as 46. In the actual embodiment, the cylinder 40 is filled with a cushioning material which helps support the quartz glass tubular element 14 in the cylinder 40. The rod 12 in this embodiment, however, is maintained in electrical contact with ground through a segmented bushing 48 biased by spring 50 against the rod. This segmented bushing is preferably of carbon graphite and is held in contact with the rod in a manner similar to a common commutator or motor brush. A suitable number of V seals 52 of plastic, shown separated in FIG. 5, together with a spring retained scraper ring assembly 54 provide a suitable sealing to prevent the entry of foreign material within the interior of housing 40.

A bead formed on the end of quartz tube 14 is captured in the slotted open end of bushing 55 in order to restrain the quartz tube 14 against axial movement.

We claim:

1. A linear variable capacitance transducer to monitor the axial position of an object comprising:

a quartz tube having a pair of capacitor plates disposed on the outer surface thereof extending longitudinally and occupying each substantially one-half of the circumference, said plates being diametrically opposed to each other;

a metallic rod slidingly reciprocal within said quartz tube, said rod being electrically insulated from the capacitor plates; and means for connecting respectively the capacitor plates and the rod to an AC signal source for varying the signal output of said source dependent upon the position of said rod with respect to said capacitor plates and in which said rod is maintained at ground potential.

2. The transducer according to claim 1 in which said capacitor plates are disposed in a helical relationship about the outer surface of said quartz tube.

3. The transducer according to claim 1 or 2 in which said rod is hollow and provided with a means including a connecting rod extending therethrough for maintaining positive contact with said rod regardless of the position or movement of said rod with respect to said quartz tube.

4. The transducer claimed in claims 1 or 2 in which means for maintaining connection between said rod and ground comprises a segmented bushing and spring means urging said segmented bushing radially inwardly against said rod.

5. The transducer claimed in claims 1 or 2 further including a housing encompassing said transducer means and sealing means within said housing through which said rod may reciprocate yet provide a means for preventing the entry of foreign matter within said housing to protect said transducer from adverse environment.

6. A linear variable capacitance transducer to monitor the axial position of an object comprising:

a tube of dielectric material having a pair of capacitor plates formed on the outer surface thereof as a coating of electrically conductive material on said outer coating which are diametrically opposite each other and electrically insulated from each other, each of said plates comprising substantially one-half of the circumference;

a metallic rod mounted for reciprocal axial movement within said tube, said rod being electrically insulated from said capacitor plates and being connected to ground potential; and means for connecting respectively the capacitor plates and the rod to an AC signal source for varying the signal output of said source dependent upon the position of said rod with respect to said capacitor plates.

7. The transducer according to claim 6, in which said capacitor plate coatings are disposed in a helical relationship about the outer surface of said tube.